United States Patent
Engel et al.

(10) Patent No.: US 8,352,351 B1
(45) Date of Patent: *Jan. 8, 2013

(54) REDUCING ACCOUNTING VOLATILITY AND RISK

(75) Inventors: Wendy J. Engel, Norwalk, CT (US); Wayne F. Perg, Sierra Vista, AZ (US); Matthew B. Schoen, Ojai, CA (US)

(73) Assignee: Concept Hedging, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,677

(22) Filed: Jan. 9, 2012

Related U.S. Application Data

(63) Continuation-in-part of application No. 12/854,151, filed on Aug. 10, 2010, now Pat. No. 8,095,448, and a continuation-in-part of application No. 12/850,596, filed on Aug. 4, 2010, said application No. 12/854,151 is a continuation-in-part of application No. 10/375,770, filed on Feb. 27, 2003, now Pat. No. 7,774,256.

(60) Provisional application No. 60/361,450, filed on Feb. 28, 2002, provisional application No. 61/231,164, filed on Aug. 4, 2009.

(51) Int. Cl.
*G06Q 40/00* (2006.01)
(52) U.S. Cl. .......................................... 705/36; 705/35
(58) Field of Classification Search ............... 705/35–40
See application file for complete search history.

(56) References Cited

U.S. PATENT DOCUMENTS

| | | |
|---|---|---|
| 2005/0055295 A1 * 3/2005 | Bateson et al. | 705/35 |
| 2008/0243714 A1 * 10/2008 | Hassett | 705/36 R |
| 2012/0011080 A1 * 1/2012 | Smith et al. | 705/36 R |

* cited by examiner

*Primary Examiner* — Rajesh Khattar
(74) *Attorney, Agent, or Firm* — Peter K. Trzyna, Esq.

(57) ABSTRACT

Memory storing terms of a contract for reducing accounting volatility and risk, the terms including specification of at least one measure of variation in a rate of return corresponding to a return on an investment portfolio, a variable speed of adjustment factor and a contract rate of return on an investment associated with the investment portfolio, wherein the amount of the measure of the variation changes over time; a computer computing an amount for the at least one measure of variation, calculating an amount for the adjustment speed factor and using the amounts in: determining at least one of a contract rate of return on the investment associated with the investment portfolio and a contract value for the investment associated with the investment portfolio to produce output.

23 Claims, 7 Drawing Sheets

REDUCING ACCOUNTING VOLATILITY AND RISK

I. PRIORITY STATEMENT

Figure 1:
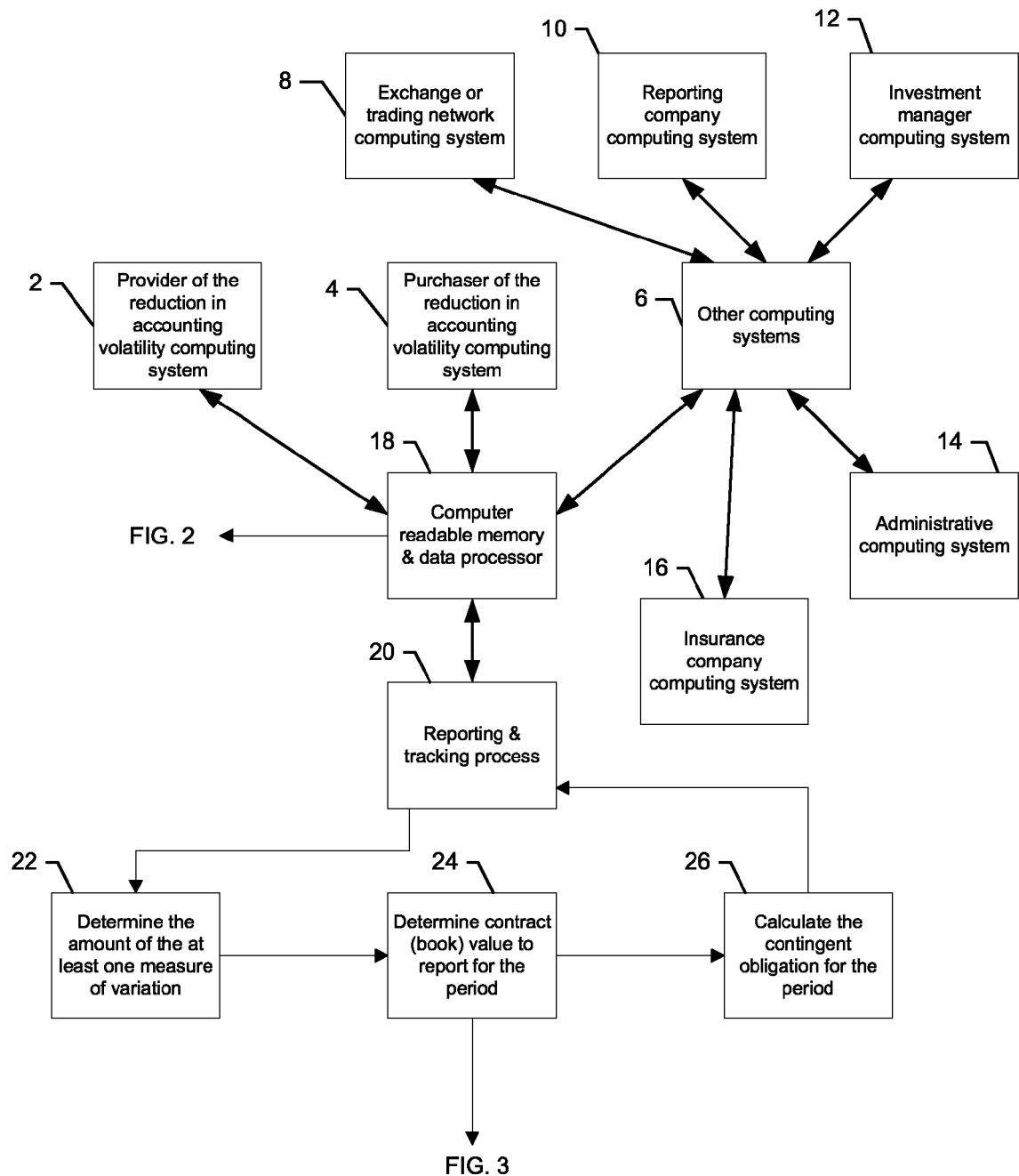

This patent application is a continuation-in-part of Ser. No. 12/854,151 filed Aug. 10, 2010, issuing as U.S. Pat. No. 8,095,448, on Jan. 10, 2012, and Ser. No. 12/850,596 filed Aug. 4, 2010, currently pending. Ser. No. 12/854,151 is a continuation-in-part of Ser. No. 10/375,770 filed Feb. 27, 2003, and issued as U.S. Pat. No. 7,774,256, on Aug. 10, 2010. Ser. No. 10/375,770 claims benefit of Ser. No. 60/361,450 filed on Feb. 28, 2002, now expired. Ser. No. 12/850,596 claims benefit of Ser. No. 61/231,164 filed Aug. 4, 2009, now expired. All of the above are incorporated by reference completely as if restated totally herein.

U.S. patent application Ser. No. 12/854,151 "Reducing Accounting Volatility", issuing as U.S. Pat. No. 8,095,4348 and U.S. patent application Ser. No. 12/850,596 "Apparatus, Article and Method for Contract Values" are incorporated by reference completely as if restated totally herein. A "stable value rate of return" as referenced in U.S. patent application Ser. No. 12/850,596 is an example of a "contract rate of return" as referenced in U.S. patent application Ser. No. 12/854,151.

II. BACKGROUND INFORMATION

A. Technical Field

The technical field is process, machine, manufacture, pertaining to computer operations, and data processing, and communication.

B. Background

Today, there is a highly developed market where banks purchase life insurance to pre-fund future employee benefit expenses. These banks make use of variable life insurance contracts with separate accounts that hold debt instruments. Generally, banks are prohibited from owning securities classified as equities. Also, it is widely believed that this prohibition applies to assets held by a variable life contract, which is owned by a bank. Of course, as market interest rates fluctuate, the underlying market value of the separate account debt instruments goes up and down. Under GAAP (see FASB Technical Bulletin (TB) 85-4), the policy is accounted for on a mark-to-market basis. Seeking to avoid earnings volatility from their life insurance purchases, banks have bought Stable Value Wraps (SVWs) inside their separate accounts. For all intents and purposes, the SVWs promise that the debt security will earn a set rate of return—which will be reflected in the principal of the debt instrument. Upon surrender of the policy, the owner will receive the amount of principal reflected in the SVW contract—nothing more or less. As a result, earnings are stable and predicable even if market interest rates fluctuate widely and the underlying policy cash surrender value goes up and down.

The parties writing the SVWs are typically not the carrier issuing the life contract or the party managing the investment. The "writers" can be either banks or insurance companies that are familiar with sophisticated derivative transactions.

During the past year, other industries have become interested in using variable life insurance to pre-fund employee benefits. Typically, in other businesses, there is no regulatory prohibition to owning equities inside of a variable life policy. Notwithstanding, prospective policy buyers are anxious to avoid the exposure to mark-to-market accounting in years when the investments are under-performing expectations. Writers of SVW contracts have been reluctant to offer contracts when the separate account securities are equities instead of debt. The proposed fees for equity SVWs have been so high as to be unattractive to the market. Accordingly, it has become useful to invent a new approach to dampen the earnings volatility from owning equities for benefit funding purposes. There is a need for a new approach that will apply most often to equities and equity-like instruments held inside a separate account of a life policy. Still, there is a need for a new approach that is equally applicable where assets are held directly by a company and accounted for using mark-to-market (e.g., tracking securities under SFAS No. 115).

III. BRIEF DESCRIPTION OF DRAWINGS

Figure 2:
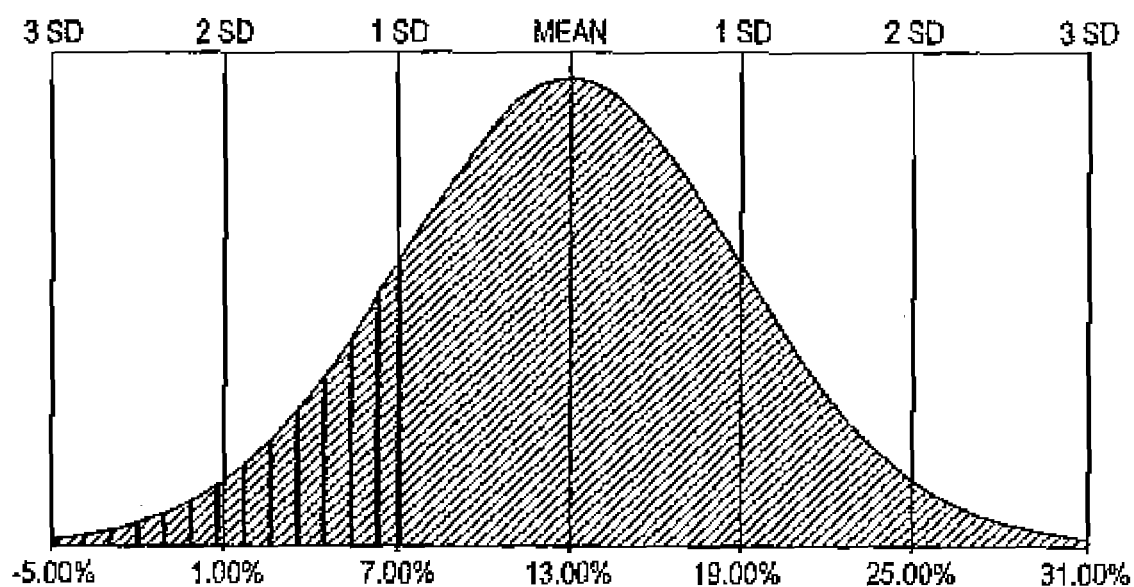
Figure 3:
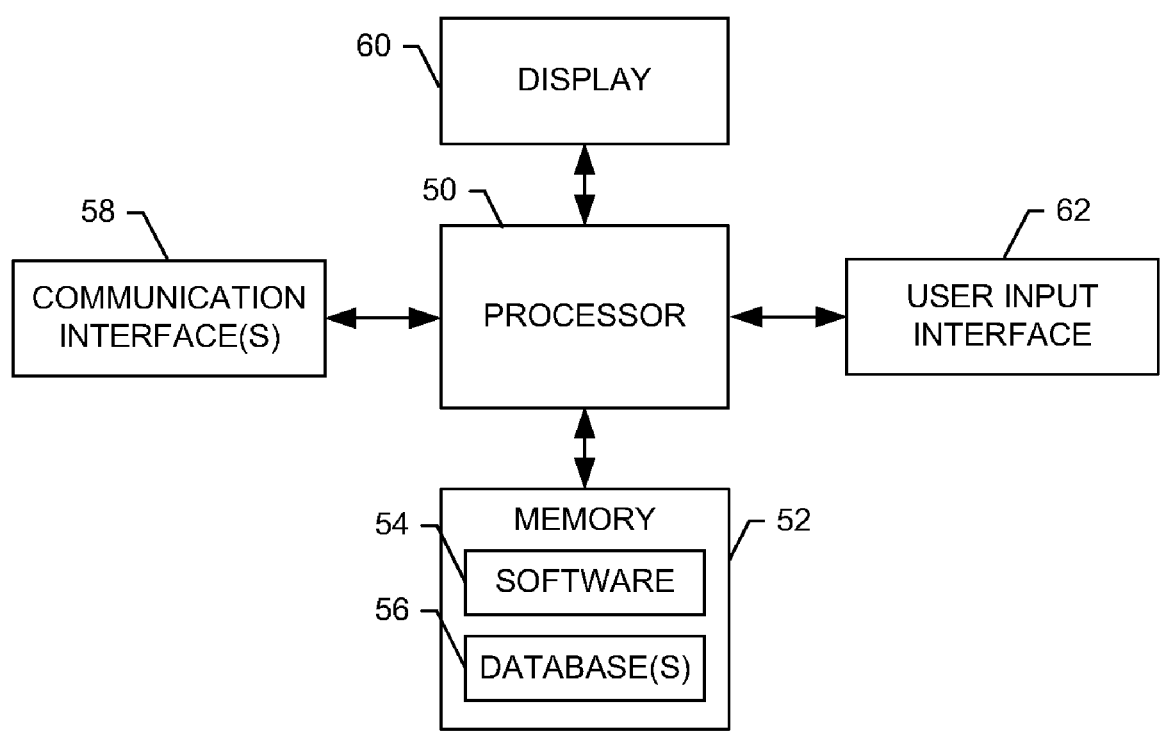
Figure 4:
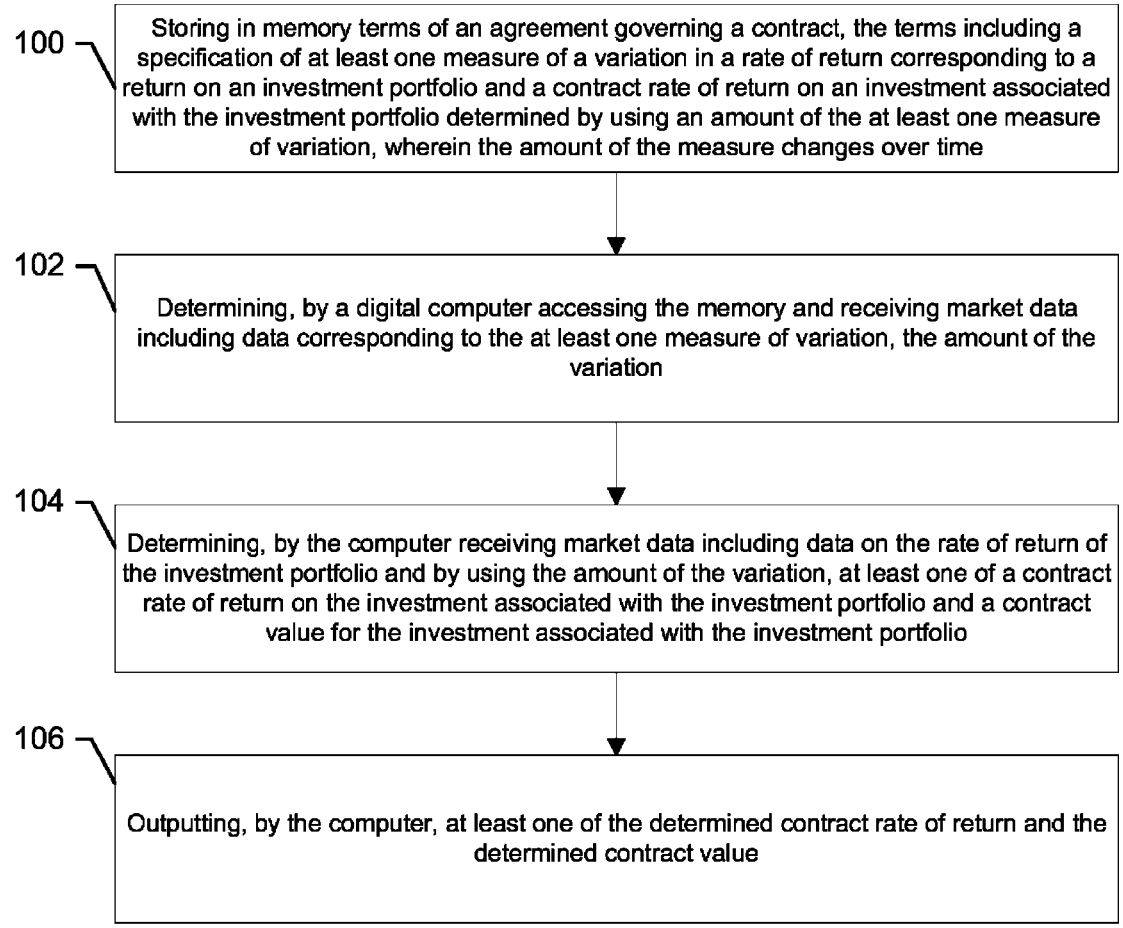
Figure 5:
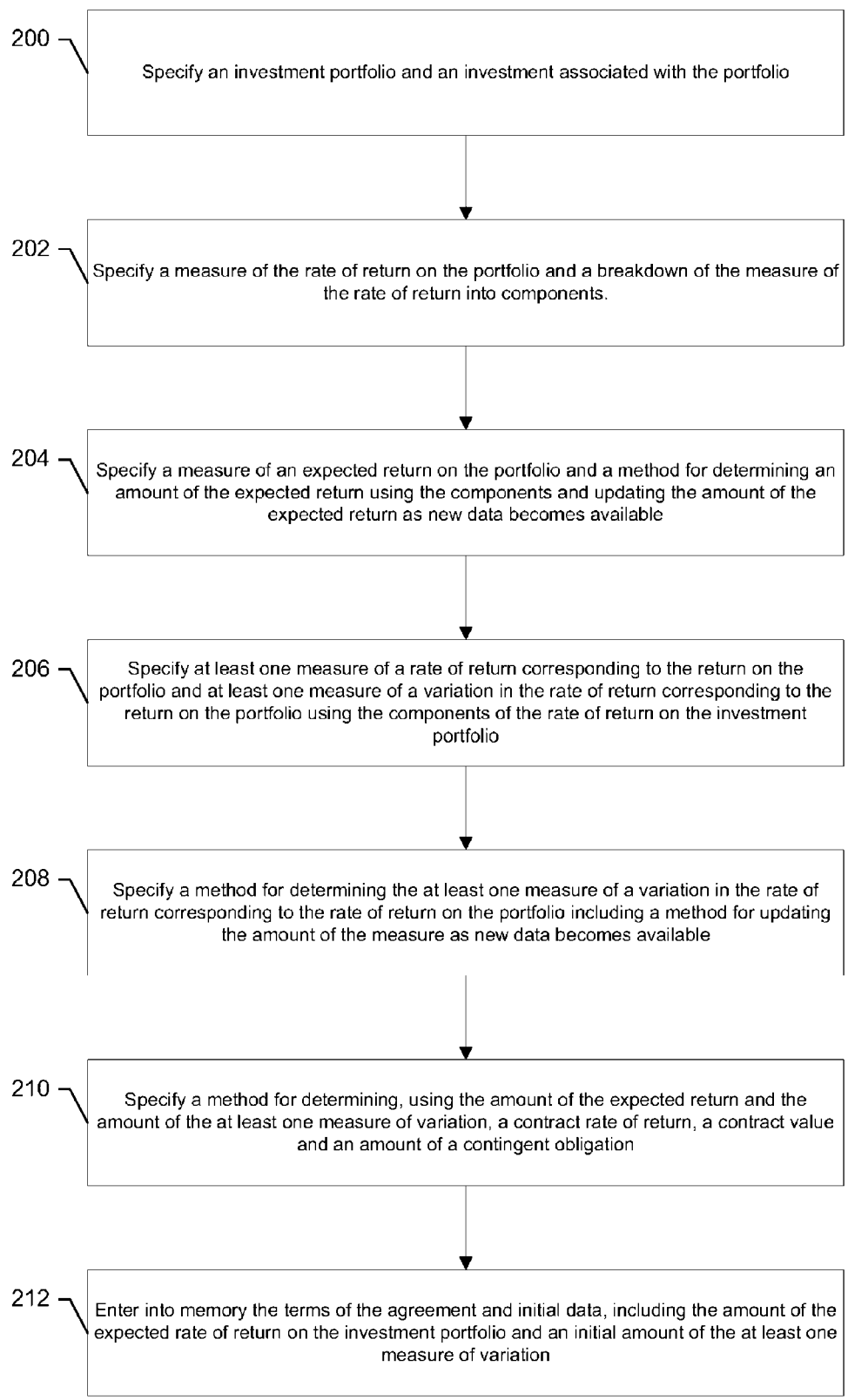
Figure 6:
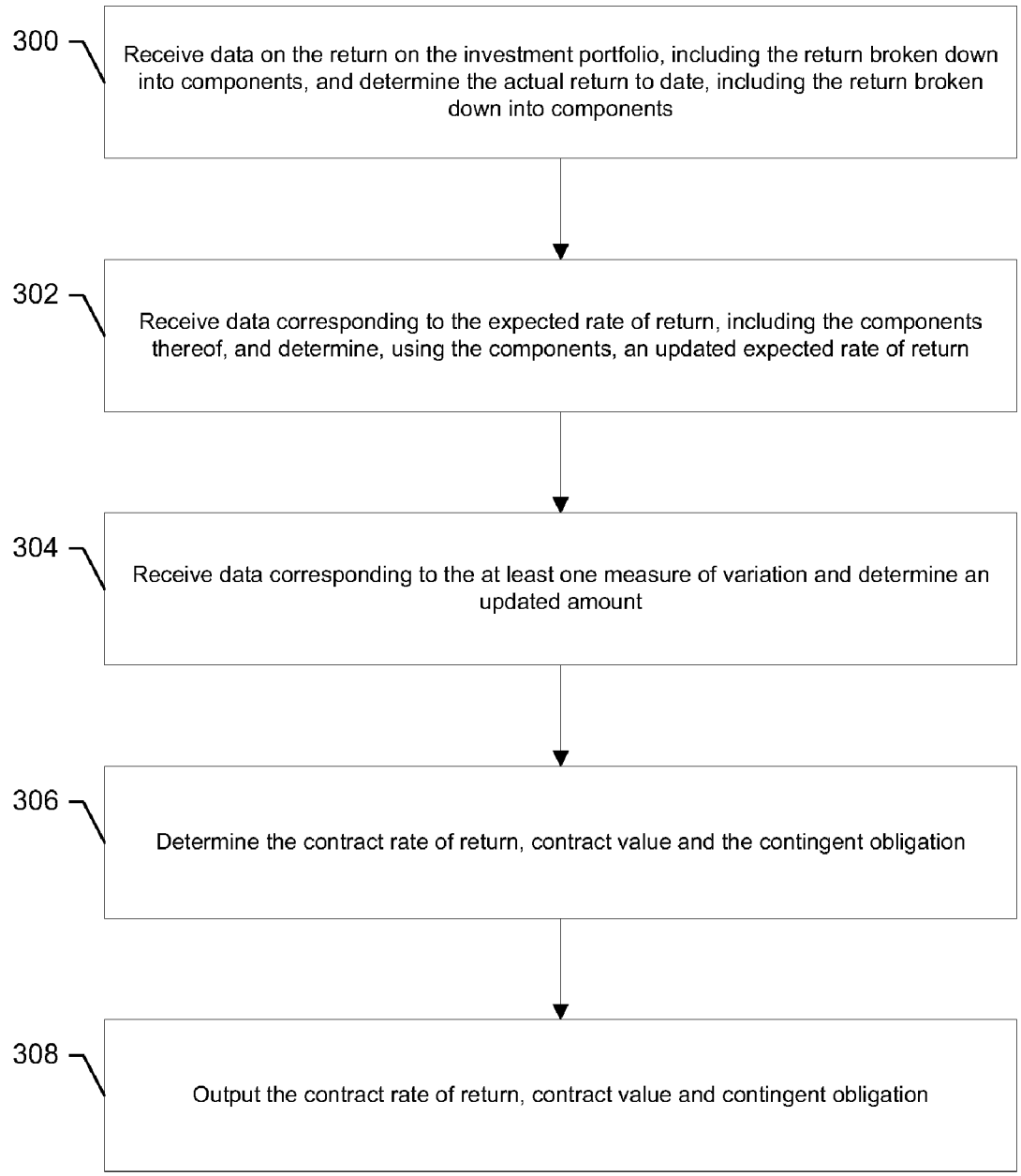
Figure 7:
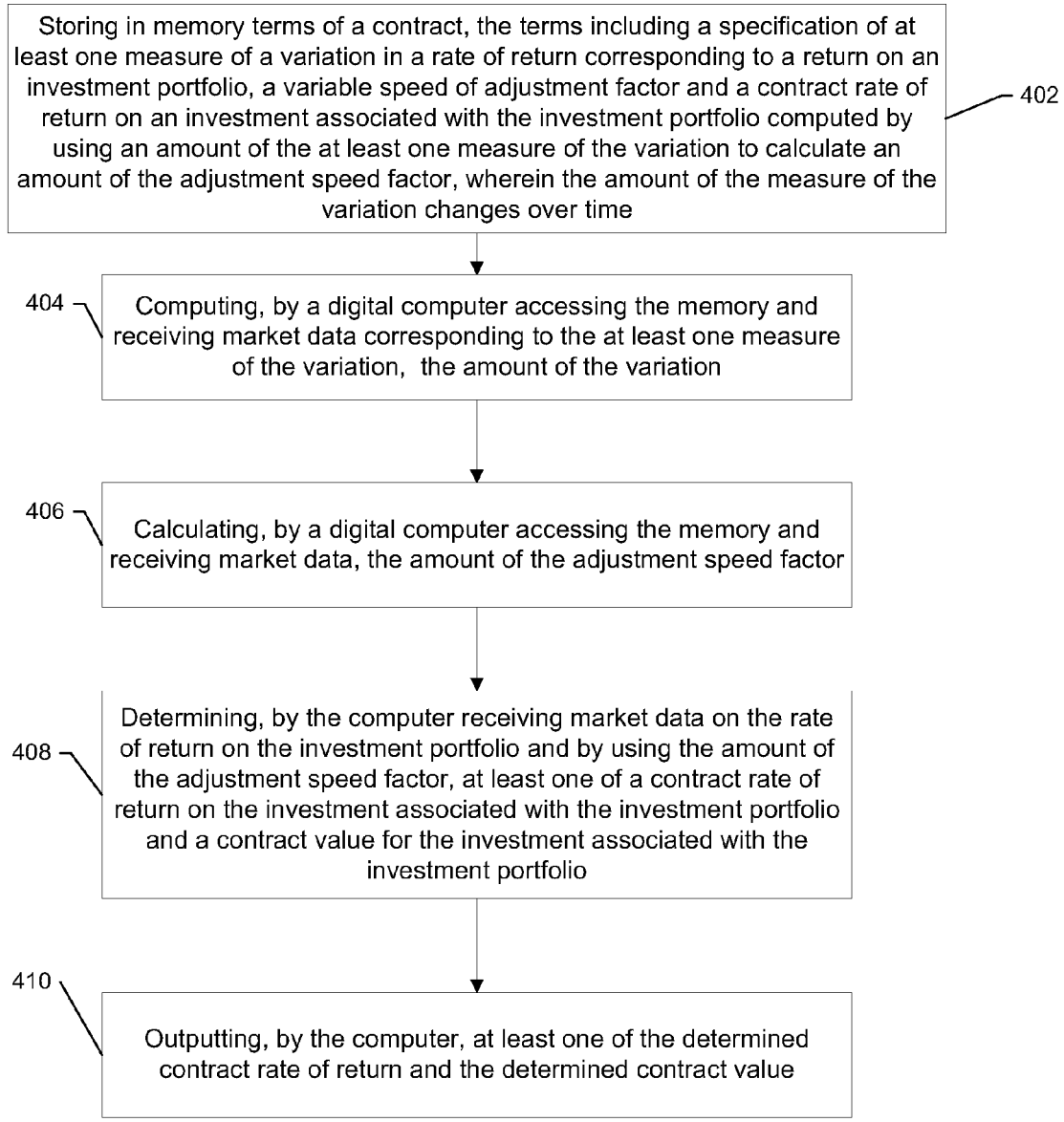

FIG. 1 is a summary flow chart of embodiments herein.
FIG. 2 is a graph of a "normal" curve.
FIG. 3 is a block illustration of embodiments herein.
FIG. 4 is a flow chart illustrating embodiments herein.
FIG. 5 is a flow chart illustrating embodiments herein.
FIG. 6 is a flow chart illustrating embodiments herein.
FIG. 7 is a flow chart illustrating embodiments herein.

IV. SUMMARY

Depending on the implementation, there is apparatus, a method for use and method for making, and corresponding products produced thereby, as well as data structures, computer-readable media tangibly embodying program instructions, manufactures, and necessary intermediates of the foregoing, each pertaining to digital aspects of reducing accounting volatility and risk.

V. MODES

We have devised a system to provide a significant reduction of income accounting volatility due to a corporate holding of equities and/or debt securities with respect to a benefit funding program. Further, the cost to the policy owner is at an affordable price. The system can be carried out with a computer apparatus, method, and/or article of manufacture, (see, generally, e.g., FIG. 1). Appreciation of the computer apparatus, method, and/or article of manufacture can be furthered by a brief explanation of the system. However, it is noted that the principles of the system are applicable to more situations than the fact pattern described herein.

The system makes possible the use of equity and equity-like instruments for funding where investors have a low tolerance for substandard or negative earnings in a reporting period. Typically, these same investors are required to account for their assets on a mark-to-market basis. Alternative equity and equity-like investments might include balanced bond and equity funds, fund of hedge funds, Russell 3000 index funds, etc.

Unlike the SVW for bank-owned life insurance, the system herein is not directed toward, and indeed can be carried out devoid of, a guarantee of a given rate of return on the subject investment. Instead, the system uses the historical financial performance information of the fund to compute the statistical mean and annual standard deviation. For the reporting period (e.g., monthly, quarterly, annual), the system compares the actual earnings realized with the historical mean and standard deviation. Under the normal agreement, if actual earnings are between one and two standard deviations below the expected mean, then the agreement obligates the writer of the contract to make up the difference in investment value between one standard deviation below the mean and the actual return. Note that the writer of the contract is not required to make any payment to the policy separate account at the end of each accounting computation and reporting period. Instead, the contract writer is obligated to make a payment in the event that the fund is sold or otherwise liquidated. Accordingly, by way of an example for variable life insurance contracts accounted for under TB 85-4, the policy owner records the obligation the same as cash value and, as a result, it is part of the GAAP earnings of the policy owner.

This system may be best understood with a simple example. Assume $1,000 of cash value in a life insurance contract separate account holding a fund of hedge funds. The mean return for the fund is 13% and the standard deviation is 6%. Accordingly, the second standard deviation below the mean return ranges from 7% to 1%. Accordingly, in our example, the program says that the policy owner will be able to report a 7% return even if actual income was only 1%, i.e., the lower limit of the second standard deviation. In other words, the contract guarantee in our example is $1,070 of cash value at the end of the year. If actual returns are 1%, then actual assets are $1,010. The writer of the contract will have an obligation of $60 in the event the policy owner surrenders the policy. Because of this obligation, the policy owner can carry a policy cash value of $1,070 on its GAAP balance sheet under TB 85-4.

Under the system, normally there is a cap or maximum exposure that the program writer has to assume. Once the actual returns fall below two standard deviations of the mean return (e.g., below 1%), the system coverage cannot take the rate of return back to one standard deviation below the mean (e.g., 7%). Instead, a fixed percentage rate of return will be added to the actual rate of return. Again, assuming that the actual return is −5% and the fixed percentage adjustment is equal to one standard deviation or 6%, then the book return is 1%. The policy cash value for GAAP is $1,010. This amount equals the actual investment value of $950 plus the writer's obligation of $60.

FIG. 2 is a graph of the "normal" curve of the example discussed above. Note the protection areas with bar shading where returns are less than one standard deviation below the mean.

System Enhancements. Under a system plan, there are a variety of methods to modify the program to adjust the fee to the owner of the investment. Of course, each cost reduction technique requires that the policy owner assume a greater proportion of the risk of sub par performance and the writer of the contract assumes a lesser proportion of the risk.

Based on the above example, the expectation is that over time the internal rate of return of the investment will be close to 13%. If the actual returns are more than one standard deviation below the mean (i.e., below 7%), then the writer incurs an obligation to the investment account. Of course, if the internal rate of return of the investment is 7% or greater over a series of years, there still can be years when returns are less than 7%. The year a substandard performance occurs (e.g., a 1% return), an obligation under the contract can arise in that year.

A highly remote but potentially large dollar risk to the contract writer is that the covered investment will consistently under-perform the one standard deviation threshold. For example, this would be the case where in the first ten years the investment returns were, say, 4% per annum. In this scenario, each year the system adds 3% of last year's investment actual value and 7% of the corresponding obligation to the accumulated obligation. Because the returns never exceed one standard deviation (e.g., 7%), the obligation will continue to increase in this hypothetical situation.

Accordingly, the writer of a contract will typically want to limit the magnitude of its obligation under the contract. That limit can be a designated fixed amount. Still, most users will prefer a formula driven limitation. A simple formula limit could be last year's actual investment value times a percentage amount (e.g., 15%). Alternatively, the limit could be a percentage of last year's guarantee amount. Today, the latter is the preferred approach. Of course, it is possible to write a contract such that the guarantee percentage limit varies from year to year. For example, in year one the percentage might start at 5% and increase 1% per year until the amount reaches, say, 15%. The system can include this risk limitation feature.

There is another method of limiting risk transfer from the contract writer to the owner of the investment fund. The contract can phase in the maximum amount of percentage points to be added to the actual return. For example, in the first year that maximum could be 3%. To continue our example, if actual returns are 2%, the guarantee return is 5%. If actual returns equal 6%, our guarantee return will still be limited to 7%, or one standard deviation below the mean in the hypothetical example.

More particularly, consider now the process, machine, and manufacture aspects pertaining to computer apparatus, data processing, and communications aspects of implementing embodiments herein. Embodiments are described hereinafter with reference to the corresponding figures. However, there are many different variations of these embodiments, and this description should not be construed as limited to the embodiments used to provide the overall teaching herefrom. Similarly, the accompanying figures illustrate embodiments intended to illustrate and exemplify in a teaching manner, by way of the prophetic teachings herein. Like numbers, in the text and figures, refer to like elements throughout.

As used herein, the term "computer" generally refers to hardware or hardware in combination with one or more program(s), such as can be implemented in software. Computers can be implemented as general-purpose computers, specialized devices, or a combination of general-purpose and specialized computing devices. Computing devices can be implemented electrically, optically, quantumly, biologically, and/or mechanically or in any combination of these technologies. A computer as used herein can be viewed as at least one computer having all functionality or as multiple computers with functionality separated to collectively cooperate to bring about the functionality. This includes single processor and multi-processor implementations of a computer. A processor can include any device that processes information or executes instructions. Computer logic flow and operations can be used in processing devices, including but not limited to: signal processors, data processors, microprocessors, and communication processors. Logic flow can be implemented in discrete circuits, combinational logic, ASICs, FPGAs, reconfigurable logic, programmed computers, or an equivalent.

Computer-readable media or medium, as used herein, includes any technology that includes a characteristic of memory. Memory technologies can be implemented using magnetic, optical, mechanical, or biological characteristics of materials. Common examples of memory include, but are not limited to, RAM, ROM, PROM, EPROM, FPGA, flash drive (s), and floppy or hard disk(s). Communications medium or connection, as used herein, is any pathway or conduit in which information can be communicated or exchanged. The pathway or conduit can be wired, optical, fluidic, acoustic, wireless, or any combination of the foregoing.

The computer apparatus can include one or more computers, which illustratively can be PC systems or server systems, and any combination of the foregoing. Depending on the implementation, computers can be adapted to communicate among themselves, or over a network such as the Internet. Programs, as used herein, are instructions that when executed by a processing device causes the processor to perform specified operations. Programs can be written in various languages, including but not limited to assembly, COBOL, FORTRAN, BASIC, C, C++, or Java. Languages can be object oriented like C++ and Java, for example. The programming language can be interpretive or compiled, or a combination of both. The programs are usually processed by an apparatus having an operating system. An operating system can be processor specific, like an RTOS (real time operating system) used in cell phones, or commercial like OSX, UNIX, Windows, or LINUX. An operating system or program can be hardwired, firmware, reside in memory or be implemented in an FPGA or reconfigurable logic.

For example, a computer apparatus can comprise a computer (e.g., an IBM™, Hewlett Packard™, MAC™, or other personal computer) with one or more processors (e.g., an Intel™ or AMD™ series processor or the like), a memory (e.g., RAM, a hard drive, disk drive, etc.), one or more input devices (e.g., keyboard, mouse, modem, or the like), and one or more output devices (e.g., a modem, a Hewlett Packard™ printer, a Dell™ monitor, or other such output device). Note that the modem is representative of a computer-to-computer communication device that can operate as an input/output device. To provide other illustrative embodiments, the computer apparatus can comprise at least one of a desktop computer, a telephonic device, a console, a laptop computer, and a mobile communication device. The mobile communication device can comprise at least one of a cellular telephone, laptop, a PDA, and an IPhone-type device. Communications between devices may be wired, for example cabled Ethernet based home or office network, wireless through IEEE 802.11a/b/g network cards or Bluetooth™, or optical through an IR port. Networking between devices may be through WANs, LANs, Intranets, Internet or peer-to-peer arrangements, or in a combination of them. Networks may include, for example, gateways, routers, bridges, switches, front end and back end servers, IPS (Internet service providers), content provider servers, scanners, copiers, printers and user computing devices. Devices on the network may include interfaces that can be as simple, such as a keyboard with an LCD screen, or can be complex, such as a web interface. Web interfaces are presented in a web browser environment. Web browsers render XML or HTML containing pictures and links in a window on the desktop, for example like Windows XP™. Firefox™, Mozilla™, Internet Explorer™, and Safari™ are some examples of well known web browsers.

Consider now the figures which illustrate so as to teach the broader principles at play.

Referring to FIG. 1, entities and processing (either or both spread out or consolidated in one way or another as may be preferred in any given application, recognizing one configuration or another may localize control and benefit) are illustrated. These can cooperate in a digital manner to carry out terms of an agreement. Please keep in mind that the particulars can be implemented in a variety of different configurations, so as to carry out the embodiment of interest.

As a teaching example, consider an embodiment which portrays and administers a method to enable a corporation to minimize any material negative effect on earnings from a volatile investment in equity and equity-like instruments. Investments suitable for such an embodiment will have historical rates of return from which it is possible to compute a mean (or other type of average) return and a standard deviation from the mean (or similar statistical measure of volatility). Often, these investments will be held in variable life insurance policy separate accounts. An implementation allows the investment returns that fall below a specific measure away from the expected mean to be recorded at that specific measure of return. The income reporting protection is truncated. Once actual returns fall below a second and lower rate of return level, the income reporting protection itself becomes limited to a fixed upward adjustment. Via this approach, the income reporting protection is significant in as much as it covers the instances where a substandard rate of return is most likely to occur. Once returns fall into the realm of unlikely and unattractive, some accounting protection will be available. Said differently, when a low probability negative event occurs (e.g., an investment loss), the protection is limited and so too is the writer's exposure under the corresponding contract. Depending on how low actual returns fall, the adjusted book accounting returns could be much less than the target minimum rate of return.

Another embodiment is directed to a computer apparatus implementing such processes as: 1) computing the actual rate of return and other performance statistics of the investment; 2) determining the investment book value to be recorded under the corresponding contract; 3) calculating the amount of the corresponding obligation that exists at the end of each reporting period; and 4) reporting and tracking the values set forth above.

The apparatus, method, and/or article of manufacture can use two types of information: 1) information related to the investment and 2) information describing the terms of the plan. Investment information itself falls into two categories. First, there is the historical information about the investment fund's performance prior to the implementation of the system, which can be handled by apparatus. This information is used to compute the rate of return statistical standards created in the system program. These values (e.g., mean and standard deviation) are included in the formula computing the periodic obligations, if any. Second, the apparatus can create investment performance information using post plan implementation investment performance data. Such data will include rate-of-return values (e.g., mean and standard deviations) when computing that period's obligation, if any.

Information regarding terms of a system plan can be used in a formula that reflects the logic of the contractual arrangement. Further, additional information might include the percentage that is applied to computed assets to establish an overall limitation as to the amount of loss protection permitted by the plan. Also, additional information might include a formula to gradually increase the amount of protection in the first few years until it reaches a maximum established by the contract.

Once the information is available to the apparatus, the data can be accessed to complete the processing to carry out an embodiment.

Computing Actual Performance Statistics. One embodiment communicates with a fund manager's computer apparatus to obtain the values that affect the rates of return of an investment: the beginning period amount, additional contributions during the period, distributions during the period, and the end of the period amount. With these fund flows and values, the system can compute a rate of return for the period. Also, using the historical data on the fund in the data, it is possible to compute a rate of return for the fund that includes the historical period. Also, the apparatus can generate standard deviation or other volatility statistics that are updated through the most current reporting period.

Determining Obligation & Limits. For each reporting period, the apparatus can use data stored in a memory operably associated with the apparatus, and information computed for the reporting period, to determine what, if any, obligation is created by the writer of the contract to the owner of the (for example) investment fund. That obligation is accounted for under GAAP as additional investment value on the books of the fund owner.

When subject to a contract, an investment does not trigger an obligation amount unless the actual return falls below a minimum level (e.g., one standard deviation below the mean). Accordingly, the starting point for this computation can be the actual rate of return and the investment asset values determined above. If the actual return falls in a corridor (e.g., between one and two standard deviations below the mean), the system will designate a contractual minimum return (e.g., one standard deviation below the mean) as the rate of return for the period. Still, if the returns are less than a pre-designated amount (e.g., two standard deviations below the mean) the actual rate of return is increased by a formula amount. Using this rate of return multiplied by last year's GAAP book value, the system computes a target asset value. If the target asset value is less than the actual asset value, then the actual asset value is the value to be used by the owner of the investment fund. There is no obligation incurred by the writer of the contract under this scenario.

Where the target asset value exceeds the actual value of the investment, the corresponding contract triggers an obligation of the writer of the corresponding contract. Under one system design, the obligation amount can simply be the difference between the target and actual values as computed by the apparatus. Still, most writers of an corresponding contract will elect to place a limit on their potential obligation to an investor. This limit will be computed by the apparatus (e.g., 10% of last period's guarantee value plus the end of the period actual asset value) and compared to the target asset value to determine the lesser of the two. The apparatus labels the lesser amount as the book value for the period.

The Obligation. The writer of the corresponding contract will want to have an accurate determination of the corresponding obligation for each reporting period. The apparatus computes the corresponding obligation to be the greater of zero and the book value of the investment less the actual value of the investment. The values for the obligation computation are derived above.

Reporting and Storing. The apparatus has a capacity to produce the values derived above via an electronic computer-to-computer communications mechanism, such as, for example, a modem, to the owner of the investment fund and to the writer of the corresponding contract. Of course, the apparatus users can determine the extent of the data to provide and if any third parties are to receive distributions. Further, the apparatus can store the computed data for inclusion in future reports and computations.

One embodiment enables a writer of an accounting "hedge" contract for an investment fund (with some type of equities) to limit the writer's downside risk and, at the same time, provide the owner of the investment with a reasonable minimum rate of return to be reported under the contract. Such accounting "hedge" contracts written for equities followed the format created in the market for debt instruments—guaranteeing some target rate of return. These early attempts proved very expensive and exposed the writer to a high degree of risk in a volatile equity market.

The apparatus creates a corridor of risk for the contract writer that can be easily quantified. The apparatus enables the writer to analyze the risk and perform sensitivity testing prior to executing a contract as well as compute and track the contract obligation once a plan is in place. Where the contract provides for a maximum obligation formula, the writer is also able to know its maximum exposure under the contract. As a result, the apparatus enables the contract writer to have better information to price the cost of the contract coverage.

From the point of view of the owner of the investment, there is no limitation on the upside of income that it can report from the investment. When the investment is under performing, there is a minimum return that it will be able to report in each period. Of course, if actual income falls below some pre-set floor, then the book return can be less than the target contract minimum. From a statistical point of view, the probabilities are high that the investment owner will always be able to report the contract target minimum return or higher.

Referring to FIG. 1, an embodiment illustrates one approach for delivering a reduction in accounting volatility. The illustrated approach can include a provider of the reduction in accounting volatility computing apparatus 2, a purchaser of the reduction in accounting volatility computing apparatus 4, other computing apparatuses 6, an exchange or trading network computing apparatus 8, a reporting company computing apparatus 10, an investment manager computing apparatus 12, an administrative computing apparatus 14, and an insurance company computing apparatus 16 all interconnected by one or more networks. Any combination thereof can also be implemented. The computing apparatus comprise computer readable memory and operably associated processor 18, and FIG. 3 shows an expanded illustration of such a computing apparatus, e.g., a digital electrical computer; a memory storing executable instructions which when executed, causes the digital (electrical) computer to perform the operations corresponding to an embodiment herein.

The computing apparatuses interact with a reporting & tracking process 20 which leads to a determining of the amount of the at least one measure of variation 22 and then a determining of a contract (book) value to report for the period 24, with FIG. 3 showing an expanded view of the process, followed by a calculating of the contingent obligation for the period 26 which then feeds back into the reporting & tracking process 20.

The network(s) can comprise any of a number of different combinations of one or more different types of networks, including data and/or voice networks. For example, the network(s) can include one or more data networks, such as a local area network (LAN), a metropolitan area network (MAN), and/or a wide area network (WAN) (e.g., the Internet), and include one or more voice networks, such as a public-switched telephone network (PSTN). Although not shown, the network(s) may include one or more switches, routers and/or other components for relaying data, information or the like between the computer apparatuses.

Referring now to FIG. 4, a block diagram of a processing for such a computer apparatus that may be configured to operate as is shown in accordance with the embodiments. Although shown as separate entities, in some embodiments, one or more processing apparatuses may support a provider of the reduction in accounting volatility computing apparatus 2, a purchaser of the reduction in accounting volatility computing apparatus 4, other computing apparatus 6, an exchange or trading network computing apparatus 8, a reporting company computing apparatus 10, an investment manager computing apparatus 12, an administrative computing apparatus 14, and an insurance company computing apparatus 16 all interconnected by one or more networks. For example, a single processing apparatus may support a logically separate, but co-located life insurance company and investment manager processing apparatus.

The processing apparatus that may be configured to operate for each entity depicted in FIG. 1 can includes various means for performing one or more functions in accordance with the embodiments, including those more particularly shown and described herein. It should be understood, however, that one or more of the apparatuses may include alternative means for performing one or more like functions, without departing from the spirit and scope of the teachings herein. More particularly, for example, as shown in FIG. 3, the apparatus can include a processor 50 connected to a memory 52. The memory can comprise volatile and/or nonvolatile memory, and typically stores content, data or the like. In this regard, the memory may store software applications 54, instructions or the like for the processor to perform steps associated with operation of the apparatus in accordance with embodiments herein. The memory may also store content transmitted from, and/or received by, the apparatus, such as in one or more databases 56. As described herein, the software application(s) may each comprise software operated by the respective entities. It should be understood, however, that any one or more of the software applications described herein can alternatively be implemented in firmware and/or hardware, without departing from the spirit and scope herein provided.

In addition to the memory 52, the processor 50 can also be connected to at least one interface or other means for displaying, transmitting and/or receiving data, content or the like. In this regard, the interface(s) can include at least one communication interface 48 or other means for transmitting and/or receiving data, content or the like. In addition to the communication interface(s), the interface(s) can also include at least one user interface that can include one or more earphones and/or speakers, a display 60, and/or a user input interface 62. The user input interface, in turn, can comprise any of a number of devices allowing the apparatus to receive data from a user, such as a microphone, a keypad, a touch display, a joystick, or other input device.

According to one aspect of embodiments herein, all or a portion of the system, including one or more entities depicted in FIG. 1, generally operates under control of one or more computer program products. A computer program product for performing the methods of embodiments can include a computer-readable storage medium, such as the non-volatile storage medium, a non-transitory medium, etc. Computer-readable program code portions, such as a series of computer instructions, can be embodied in such a computer-readable storage medium. A computer readable medium can thusly storing executable instructions, which when retrieved and executed on a digital computer, causes the digital electrical computer to perform the operations corresponding to an embodiment herein.

FIG. 4 can be viewed as a flow chart of one such embodiment, though of course many embodiments are disclosed herein. In a method using an apparatus for implementing an embodiment for the reduction in accounting volatility of an investment associated with an investment portfolio, wherein the method is implemented on at least one processing apparatus. The processing apparatus(es) may be associated with one or more of the entities depicted in FIG. 1. If more than one processing apparatus is implementing the embodiment, the processing apparatuses may work interdependently, independently, or some combination of both.

The embodiment (FIG. 4) can be viewed as a method of using an apparatus with regard to an agreement governing a contract, the terms including a specification of at least one measure of a variation in a rate of return corresponding to a return on an investment portfolio and a contract rate of return on an investment associated with the investment portfolio determined by using an amount of the at least one measure of the variation, wherein the amount of the measure of the variation changes over time. The reduction in accounting variability can achieved as a result of the ability to account for an investment using a contract rate of return and a contract value (also referred to as a book value) rather than using a market rate of return and a market value.

The embodiment, including variations of the embodiment, can expand investment choices for purchasers of bank owned life insurance (BOLI) and corporate owned life insurance (COLI) by reducing the accounting volatility associated with investments associated with investment portfolios that include equity instruments and, in the case of BOLI, creating investments associated with the portfolios that are bank-eligible investments.

FIG. 4 is a flow chart of such an embodiment. Storing in memory terms of an agreement governing a contract, the terms including a specification of at least one measure of a variation in a rate of return corresponding to a return on an investment portfolio and a contract rate of return on an investment associated with the investment portfolio determined by using an amount of the at least one measure of the variation, wherein the amount of the measure of the variation changes over time 100. Determining, by a digital computer accessing the memory and receiving market data including data corresponding to the at least one measure of the variation, the amount of the variation 102. Determining, by the computer receiving market data including data on the rate of return on the investment portfolio and by using the amount of the variation, at least one of a contract rate of return on the investment associated with the investment portfolio and a contract value for the investment associated with the investment portfolio 104. Outputting, by the computer, at least one of the determined contract rate of return and the determined contract value 106.

In various variations of the embodiment the at least one measure of the variation includes, but is not limited to, at least one of: a variance, a covariance, a coefficient of variation, a standard deviation, a semi-variance, a semi-standard deviation, a third central moment (skewness), a fourth central moment (kurtosis), and a volatility index.

In an illustrative variation of the embodiment, the at least one measure of a variation in a rate of return corresponding to an investment portfolio that is 50% equities and 50% debt is the standard deviation is the standard deviation of the rate of return on a hypothetical portfolio made up of 50% the S&P 500 index and 50% the Barclay's U.S. Aggregate index. In a variation of this illustrative variation, the at least one measure a variation in a rate of return corresponding to the investment portfolio is three measures of variation: 1) the variance in the rate of return on the S&P 500 index; 2) the variance of the rate of return on the Barclay's U.S. Aggregate index; and, 3) the covariance between the two. In yet another variation of this illustrative variation, the at least one measure of a variation in a rate of return corresponding to the investment portfolio is three measures of variation is three measures of the variation of the rate of return on a hypothetical portfolio made up of 50% the S&P 500 index and 50% the Barclay's U.S. Aggregate index: 1) the standard deviation; 2) the third central moment (skewness); and, 3) the fourth central moment (kurtosis).

In an other variation of the embodiment, the at least one measure a variation in a rate of return corresponding to the investment portfolio is a volatility index for investment index corresponding to the investment portfolio. In an example of this variation, the investment portfolio is a portfolio of large capitalization stocks and the at least one measure of a variation in a rate of return corresponding to the investment portfolio is the OBOE Volatility Index® (VIX®), which is a measure of the expected (by the market) volatility of the S&P 500 index.

In still another variation, the investment associated with investment portfolio includes an ownership interest in the investment portfolio. In yet an other variation, the investment associated with the investment portfolio includes a bond issued by an entity that owns the investment portfolio.

In one variation, the entity that owns the investment portfolio is a partnership. In an other, the entity is a limited liability company. In still an other, it is an investment fund. In yet an other, the investment fund is an investment fund registered with the SEC. In still an other, the investment fund is an investment fund not registered with the SEC. In yet an other, the investment fund is a closed-end fund. In still an other, the investment fund is an open-end fund. In yet an other, the investment fund is an exchange-traded fund. In still an other, the investment fund is a hedge fund. In yet an other, the investment fund is a private equity fund.

In still an other variation, the entity that owns the investment portfolio is a separate account of an insurance company and the ownership interest in the investment portfolio is an ownership interest in a separate account insurance policy.

In yet another variation, the ownership interest in the investment portfolio is an ownership interest within a retirement plan. In still another variation, the retirement plan includes an elective deferral provision. In yet an other, the retirement plan is a defined-contribution pension plan. In still an other, the retirement plan is a defined-benefit pension plan. In yet an other, the retirement plan is a cash-balance pension plan. In still an other, the retirement plan is an IRA.

In still an other variation, the ownership interest in the investment portfolio is an ownership interest within a profit sharing plan. In yet another, the ownership interest in the investment portfolio is an ownership interest within a profit sharing plan in which there is an elective deferral provision.

In yet an other variation, the ownership interest in the investment portfolio is an ownership interest within an employee stock ownership plan (ESOP). In still an other, the ownership interest in the investment portfolio is an ownership interest within an employee stock ownership plan (ESOP) in which there is an elective deferral provision.

In still an other variation of the embodiment, the determining of the at least one of the contract rate of return on the investment associated with the investment portfolio and the contract value of the investment associated with the investment portfolio occurs periodically, where the time period between determinings (referred to as the adjustment period) can be a quarter, a month, a week, a day, or any other specified time period. In yet another variation, the determining of the contract rate of return on the investment occurs at the end of the adjustment period. In still an other, the determining of the contract rate of return on the investment occurs at the beginning of the adjustment period.

In yet an other variation of the embodiment, the amount of the at least one measure of the variation changes over time as a period of time over which the amount of the variation is calculated changes. For example, the at least one measure of the variation may be the standard deviation of the rate of return on the S&P 500 index calculated over the 6 month period ending at the end of the last adjustment period.

In still an other variation of the embodiment, the amount of the at least one measure of the variation changes over time as the measure of a time period over which the measure of the variation is defined changes. For example, the at least one measure of the variation may be the standard deviation of the average annual rate of return on the S&P 500 index defined over a time period whose length equals the period of time between the beginning of the first adjustment period and the end of the last adjustment period. In one variation, the average annual rate of return on the S&P 500 is defined to be equal to the arithmetic mean of the annual rate of returns over the total number of adjustment periods to date. In an other variation, the average annual rate of return on the S&P 500 is defined to be equal to the geometric mean of the annual rate of returns over the total number of adjustment periods to date.

In yet another variation of the embodiment, the amount of the at least one measure of the variation changes over time both as a period of time over which the amount of the variation is calculated changes and as the measure of a time period over which the measure of the variation is defined changes. For example, the period of time over which the standard deviation of the rate of return changes as the time period over which the standard deviation of the average annual rate of return on the S&P 500 index is defined changes.

In an illustrative variation of the embodiment, the contract rate of return on the investment is determined to be equal to the greater of a percentage of the market return on the investment portfolio associated with the investment or a specified minimum rate of return where the amount of the percentage and/or the amount of the specified minimum rate of return declines as the amount of the at least one measure of variation increases. In a further variation of this illustrative variation, the amount of the percentage and/or the amount of the minimum rate of return decline as the ratio of the market return to the amount of the at least one measure of variation falls.

In one variation of this illustrative embodiment, the market return is the market return on the investment portfolio for the latest adjustment period. In an other variation, the market return on the investment portfolio is the geometric mean of the annual rate of return on the market portfolio for all of the adjustment periods to date. In still an other variation, the market return on the investment portfolio is the arithmetic mean of the annual rate of return on the market portfolio for all of the adjustment periods to date. In yet an other variation, the market rate of return on the portfolio is a moving average of the annual rate of return on the market portfolio for a specified number of adjustment periods.

Still another variation of the embodiment further includes storing a measure of an expected rate of return on the investment portfolio, and wherein the determining includes using the expected rate of return in determining at least one of the contract rate of return on the investment and the contract value for the investment.

In a variation of this variation, the measure of the expected rate of return is the mean (or median or an other measure of the central tendency) of the rate of return on the investment portfolio. In an other variation, the measure of the expected rate of return is a weighted average of the mean returns on one or market averages (e.g., the S&P 500 index, the Barclay's U.S. Aggregate index, etc.). In still an other variation, the measure of the expected rate of return is estimated using a time series methodology (e.g., Box-Jenkins, exponential smoothing, etc.). In yet an other variation, the measure of the expected rate of return is estimated using an econometric model. The variations can further include the measure of the expected rate of return varying over time and calculating the expected rate of return.

In another illustrative variation of the embodiment, the contract rate of return on the investment is determined to be equal to be the greater of the market return on the investment portfolio associated with the investment or a specified minimum rate of return b subject to a maximum amount for the contract rate of return equal to a factor a times the measure of the expected rate of return where a and/or b fall as the amount of the at least one measure of variation increases and/or as the market rate of return falls relative to the expected measure of return as measured in units of the amount of the at least one measure of variation.

In one variation of this illustrative embodiment, the market return is the market return on the investment portfolio for the latest adjustment period. In an other variation, the market return on the investment portfolio is the geometric mean of the annual rate of return on the market portfolio for all of the adjustment periods to date. In still an other variation, the market return on the investment portfolio is the arithmetic mean of the annual rate of return on the market portfolio for all of the adjustment periods to date. In yet an other variation, the market rate of return on the portfolio is a moving average of the annual rate of return on the market portfolio for a specified number of adjustment periods.

In an illustrative variation of the embodiment, the contract rate of return on the investment is determined to be equal to the greater of a percentage of the market return on the investment portfolio associated with the investment or a specified minimum rate of return where the amount of the percentage and/or the amount of the specified minimum rate of return declines as the amount of the at least one measure of variation increases. In a further variation of this illustrative variation, the amount of the percentage and/or the amount of the minimum rate of return decline as the ratio of the market return to the amount of the at least one measure of variation falls.

In one variation of this illustrative embodiment, the market return is the market return on the investment portfolio for the latest adjustment period. In an other variation, the market return on the investment portfolio is the geometric mean of the annual rate of return on the market portfolio for all of the adjustment periods to date. In still an other variation, the market return on the investment portfolio is the arithmetic mean of the annual rate of return on the market portfolio for all of the adjustment periods to date. In yet an other variation, the market rate of return on the portfolio is a moving average of the annual rate of return on the market portfolio for a specified number of adjustment periods.

Still another variation of the embodiment further includes storing a measure of an actual rate of return on the investment portfolio, and wherein the determining includes using the actual rate of return in determining at least one of the contract rate of return on the investment and the contract value for the investment. Yet another variation still further includes the measure of the actual rate of return varying over time and the calculating including calculating the amount of the measure of the actual rate of return.

In yet an other variation of the embodiment, the measure of the rate of return (expected and/or actual) is broken down into components, and the determining includes using the components in determining at least one of the contract rate of return and the contract value for the investment. In a variation of this variation, the components include a constant dollar (a real, net of inflation) return and a rate of inflation. In still an other variation of the variation, the components include a dollar return and a currency return. In yet an other variation of the variation, the components further include a currency return. In still an other variation of the variation, the components further include a risk premium. In yet another variation of the variation, the risk premium includes at least one of a credit risk premium and a liquidity risk premium. In still another variation of the variation, the at least one measure of the variation of the return includes a measure of the variation of at least one of the components.

In still an other variation of the embodiment, the terms of the agreement governing the contract comprise terms of an agreement governing a contract for an investment from a group consisting of a variable life insurance policy, a regulated investment company, a publicly traded partnership, a hedge fund, an investment company, and any combination thereof, the investment corresponding to the investment portfolio.

In yet an other variation of the embodiment, the contract rate of return on the investment comprises a contingent obligation of the provider of the reduction in accounting volatility.

FIG. 5 is a flow chart illustrating embodiments. First, an investment portfolio and an investment associated with the investment portfolio are specified 200. The specification of the portfolio can include the entity that holds and/or owns the portfolio, the investment policies used to manage the portfolio and characteristics of the investments that comprise the portfolio. For example, the entity that holds the portfolio can be a limited liability company owned by qualifying investors and the investment managers. The investment policies can be to minimize costs by replicating the performance of specified investment indices and maintain a balance of 50% equities and 50% debt instruments with 40% invested in U.S. securities, 40% in Eurozone securities, and 20% in emerging market securities. Characteristics of the securities can include, in addition to those defined by the investment policies, the split between government, corporate and asset-backed debt instruments and the average duration of the debt portfolios.

The specification of the investment associated with the investment portfolio 200 can include specifying that it is an ownership interest in the investment portfolio or a bond issued by the entity that owns the investment portfolio. For example, the investment can be a bond issued by the limited liability company that owns the portfolio. The bond can be a long-term (e.g., 20 years) bond which offers investors in bank owned life insurance (BOLI) and/or corporate owned life insurance (COLI) the ability to earn returns that include both an equity and a foreign security component, thus increasing the diversification of their investment.

In the next step, a measure of the rate of return on the portfolio is specified and the measure of the return is broken down into components 202. The rate of return measure can be the annual rate of return on the portfolio with annual compounding, measured in U.S. dollars. The components of the rate of return can include the rate of return on U.S. equities, the rate of return on U.S. debt instruments, the rate of return on Eurozone equities, the rate of return on Eurozone debt instruments, the rate of return on emerging market equities and the rate of return on emerging market debt instruments. The returns on the U.S. securities may be further broken down into the components of the constant-dollar (real, net of inflation) return and the inflation rate. The returns on the foreign securities may be further broken down into a constant-currency (real, net of inflation) return, an inflation rate, and a currency return (due to the appreciation, or depreciation, of the foreign currencies relative to the U.S. dollar.

Then a measure of an expected return on the portfolio is specified together with a method for determining an amount of the expected return using the components of the return and for updating the amount of the expected return as new data becomes available 204. For example, the measure of the expected return can be the expected geometric mean annual (with annual compounding) rate of return on the portfolio in U.S. dollars over the life of the bond (20 years). The method for determining an amount of the expected return using the components can be to use a combination of historical performance data and publicly available forecasts. For example, an expected rate of return on the U.S. equities component of the portfolio's return can be estimated using a combination of the historical geometric mean real (constant-dollar) return on the S&P 500 as compiled by Ibbotson and Associates and publicly available inflation forecasts. Adding the long-term geometric mean rate of return on the S&P 500, adjusted for the current stabilized market price/earnings ration (the ratio of stock prices to a 10 year moving average of earnings) and the mean expected inflation rate can determine an expected return for this component of the portfolio.

The method further includes a method for updating the amount of the expected return (and its components as data becomes available 204. For example, the expected return for the U.S. equity component of the portfolio's expected return can be updated as new data on earnings, earnings growth rates, and inflation forecasts is received. Expected currency returns can be updated as new data on relative inflation rates, economic growth rates and trade balances is received.

At least one measure of a rate of return corresponding to the return on the portfolio and at least one measure of a variation in the rate of return corresponding to the return on the portfolio are specified using the components of the return on the investment portfolio 206. For the U.S. debt securities component of the portfolio, the rate of return on the Barclay's U.S. Aggregate index can be the specified measure corresponding to the return on that component of the portfolio and for the U.S. equities, the return on the S&P 500 index can be the specified measure corresponding to the return on the U.S. equities component of the portfolio. The returns on other market indexes can be specified as the measures corresponding to the returns on other components of the portfolio.

At least one measure of a variation in the rate of return corresponding to the return on the portfolio is specified using the components of the portfolio 206. For debt instrument components of the portfolio, a specified volatility measure can be the average duration of the debt portfolio component. For components with a corresponding market index and for which market index a volatility index is available (e.g., the VIX®) volatility for the S&P 500 index, corresponding to the U.S. equities component of the portfolio). For each of the components, a specified volatility measure can be the variance-covariance matrix of the returns on all of the corresponding market indexes.

A method is specified for determining the at least one measure of a variation in the rate of return corresponding to the rate of return, including a method for updating the amount of the measure as new data becomes available 208. For example, duration as a measure of the volatility of debt instrument components of the portfolio can be determined by calculating the actual average duration of the debt securities held in the portfolio and the duration amount can be updated every adjustment period by recalculating the current actual average duration of the debt securities held in the portfolio. A volatility index measure of volatility can be determined by accessing the most recently published number for the index and updated every adjustment period by accessing the most recently published number. A variance-covariance matrix for the corresponding market indexes can be determined by obtaining latest available return data for the specified return measure (e.g., returns per day, week, month, quarter, etc.) for the specified calculation period (e.g., a month, quarter, year, 5 years, etc.) for all of the corresponding indexes and performing the requisite calculations. The matrix can be updated every adjustment period by recalculating the matrix using the latest available return data.

A method is specified for determining, using the amount of the expected return and the amount of the at least one measure of variation, a contract rate of return, a contract value and an amount of a contingent obligation 210. The amount of the contract rate of return can equal a weighted (by capitalization) average of the contract returns on each component of the portfolio. The contract rate of return on a component can equal the greater of: 1) a factor a times the amount (for the adjustment period) of the actual return on that component of the portfolio for the adjustment period; and, 2) a minimum rate of return b; where both a and b fall as the amount of the measure of volatility for the component increases and both a and b are further adjusted in response to the difference to date between the geometric mean of the actual returns on the component to date and the determined (this adjustment period) amount of the expected return for the component.

The term of the agreement (including 200-210) and initial data, including the amount of the expected return on the investment portfolio and an initial amount of the at least one measure of variation 212.

FIG. 6 illustrates the implementation, using the computer, of the agreement whose terms were entered in 212. Every adjustment period, data is received on the return on the investment portfolio, including the return broken down into components, and the actual return to date is determined, including the return broken down into components 300. Data corresponding to the expected rate of return, including the components, is received and an updated expected rate of return is determined using the components 302. Data is received corresponding to at least one measure of variation and an updated amount is determined 304. The contract rate of return, contract value and the contingent obligation is determined 306. The contract rate of return, contract value and contingent obligation are outputted 308.

FIG. 7 illustrates an embodiment which may reduce the risk of "falling off the cliff" (i.e., the risk that the contract value will deviate from the market value of an investment associated with an investment portfolio by an amount that triggers a write-down of the investment or other remedy specified in the contract) by incorporating a variable speed of adjustment factor into the terms of the contract and using an amount of a measure of variation in a rate of return corresponding to the investment portfolio to calculate the amount of the adjustment speed factor wherein the amount of the measure of variation changes over time.

An increase in the speed of adjustment factor in response to an increase in the measure of the amount of variation in the rate of return may reduce the deviation of the contract value from the market value, thus reducing the risk of "falling off the cliff." The increase in the speed of adjustment factor caused by the increase in the measure of variation may be further augmented by a factor or factors reflecting the increase in risk as the amount of the ratio of the contract value divided by the market value (CV/MV) approaches a contractually specified "breach ratio" (BR), where BR is stored in memory and used in calculating the amount of the adjustment speed factor.

The at least one measure of the variation in the rate of return corresponding to the return on an investment portfolio may take any desired form. One possible measure is a standard deviation in the rate of return relative to a moving average of the rate of return over a specified period (e.g., 12 months, 18 months, etc.). An other possible measure is a semi-variance of the rate of return relative to a moving average of the rate of return over a specified period (e.g., 12 months, 18 months, etc.). Still other possible measures of the variability of the return include a volatility index or indices and implied volatilities calculated from option values using a formula or formulas for option valuation.

An other possible measure of the variation in the rate of return is the variation of the rate of return relative to an expected rate of return on the portfolio (EY) over the most recent period of X months, where X equals 12, 18 or any other number of months, and the variation is calculated as a standard deviation, variance, semi-variance, etc.

The measure of an expected rate of return on the portfolio, EY, specified in a contract may be any form of desired measure and stored in memory. An amount of the expected return may be computed and the amount of the expected return may be used in determining the at least one of the contract rate of return and contract value.

For investment portfolios of debt securities, the measure of EY may be a current or lagged yield to worst (Y) of the investment portfolio, a moving average of Y, a built-up moving average of Y, etc. If a moving average or built-up moving average of Y is used to compute an amount for EY, the length of the moving average may be chosen to be approximately equal to the average duration of the securities in the investment portfolio. Other methods of computing an amount for EY may include using a moving average of the rate of return on the investment portfolio, long-term average returns on the types of securities in the investment portfolio, and econometric methods using a variety of economic and financial variables.

The calculation of an amount for the adjustment speed factor may be asymmetric with regard to the relationship of the contract value, CV, to the market value, MV, of the investment associated with the investment portfolio. For example, if MV is less than CV, the adjustment speed factor may increase as the amount of the at least one measure of variation in the rate of return increases but if MV is greater than CV, the adjustment speed factor may remain fixed at a constant amount regardless of the amount of the at least one measure of variation in the rate of return.

The calculating of an amount for the adjustment speed factor may be carried out as one part of the calculating of a contract rate of return (CR) according to formula for calculating CR that is one of the terms of the contract stored in memory. An example of a formula for calculating CR where an amount for the adjustment speed factor, A, is calculated using an amount of a measure of a variation in a rate of return is:

$$CR = ((MV+EA)/CV)^A * (1+EY) * (1-EF) - 1 \text{ and}$$

$$A = x*V/d \text{ for } (MV+EA)/CV < 1;$$

$$A = 1/d \text{ for } (MV+EA)/CV > 1$$

Where:
CR is the contract rate of return (may also be referred to as the crediting rate).
MV is the market value.
EA is the Enhancement Amount.
CV is the contract value.
V is the amount of the variation in the rate of return relative to EY.
A is the Adjustment speed factor.
EY is a built-up moving average of Y, the Yield to Worst of the investment portfolio.
EF is the amortization factor for fully amortizing EA and wherein EA is amortized relative to MV.
x and d are specified constants.

An amount for the adjustment speed factor, A, may be calculated using other factors in addition to V, the amount of the variability. An example of a formula for calculating A as a function of both V and the amount of the MV/CV ratio relative to the breach ratio, BR (the ratio of MV/CV that triggers an event such as a write-down) is:

$$A = xV/(a+b*((MV+EA)/CV-BR)/(1-BR)) \text{ for } (MV+EA)/CV > BR \text{ and } \leq 1$$

$$A = xV/a \text{ for } (MV+EA)/CV \leq BR$$

$$A = 1/(a+b) \text{ for } (MV+EA)/CV > 1$$

Where:
a and b are specified constants.
BR is the Breach Ratio (the ratio of MV/CV that triggers a write-down of investment value).

FIG. 7 is a flow chart of an embodiment, storing in memory terms of a contract, the terms including a specification of at least one measure of a variation in a rate of return corresponding to a return on an investment portfolio, a variable speed of adjustment factor and a contract rate of return on an investment associated with the investment portfolio computed by using an amount of the at least one measure of the variation to calculate an amount of the adjustment speed factor, wherein the amount of the measure of the variation changes over time 402. Computing, by a digital computer accessing the memory and receiving market data corresponding to the at least one measure of the variation, the amount of the variation 404. Calculating, by a digital computer accessing the memory and receiving market data, the amount of the adjustment speed factor 406. Determining, by the computer receiving market data on the rate of return on the investment portfolio and by using the amount of the adjustment speed factor, at least one of a contract rate of return on the investment associated with the investment portfolio and a contract value for the investment associated with the investment portfolio 408. And outputting, by the computer, at least one of the determined contract rate of return and the determined contract value 410.

In sum, appreciation is requested for the robust range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined in the appended claims.

Thus, although only a few exemplary embodiments have been described in detail above, it is respectfully requested that appreciation be given for the modifications that can be made based on the exemplary embodiments, implementations, and variations, without materially departing from the novel teachings and advantages herein. Accordingly, such modifications are intended to be included within the scope defined by claims. In the claims, and otherwise herein, means-plus-function language is intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

Although specific terms are employed herein, they are used in a generic and descriptive sense only and not for purposes of limitation.

We claim:

1. A method of using an apparatus to reduce accounting volatility and risk, the method including:
   storing in memory terms of a contract, the terms including a specification of at least one measure of a variation in a rate of return corresponding to a return on an investment portfolio, a contract rate of return on an investment associated with the investment portfolio, and a variable speed of adjustment factor used in determining the contract rate of return wherein the variable speed of adjustment factor is computed by using an amount of the at least one measure of the variation and the amount of the at least one measure of the variation changes over time;
   computing, by a digital computer accessing the memory and receiving market data corresponding to the at least one measure of the variation, the amount of the variation;
   calculating, by a digital computer accessing the memory, using the amount of the variation, and receiving market data, the amount of the adjustment speed factor;
   determining, by the computer receiving market data on the rate of return on the investment portfolio and by using the amount of the adjustment speed factor, at least one of a contract rate of return on the investment associated with the investment portfolio and a contract value for the investment associated with the investment portfolio;
   and outputting, by the computer, at least one of the determined contract rate of return and the determined contract value.

2. The method of claim 1, wherein the at least one measure of the variation includes at least one of: a variance, a covariance, a coefficient of variation, a standard deviation, a semi-variance, a semi-standard deviation, a third central moment, a fourth central moment, a duration, a volatility index and an implied volatility.

3. The method of claim 1, further including storing a measure of an expected rate of return on the investment portfolio, and wherein the computing includes computing an amount of the expected return and the determining includes using the amount of the expected rate of return in the determining said at least one of the contract rate of return on the investment and the contract value for the investment.

4. The method of claim 3, wherein the at least one measure of the variation in the rate of return is a measure of the variation of the rate of return relative to the expected rate of return on the investment portfolio.

5. The method of claim 3, wherein the measure of the expected rate of return is a yield to worst of the investment portfolio.

6. The method of claim 3, wherein the measure of the expected rate of return is a moving average of the yield to worst of the investment portfolio.

7. The method of claim 3, wherein the measure of the expected rate of return is a built-up moving average of the yield to worst of the investment portfolio.

8. The method of claim 3, wherein the measure of the expected rate of return is a moving average of the rate of return on the investment portfolio.

9. The method of claim 3, wherein the amount of the measure of the expected return is determined using the long-term average returns of the types of securities in the investment portfolio.

10. The method of claim 3, wherein the amount of the measure of the expected rate of return is determined econometrically using economic and financial data.

11. The method of claim 1, further including storing a breach ratio, and wherein the calculating includes using the breach ratio in calculating the amount of the adjustment speed factor.

12. An apparatus adapted to reduce accounting volatility and risk, the apparatus including:
   memory storing terms of a contract, the terms including a specification of at least one measure of a variation in a rate of return corresponding to a return on an investment portfolio, a contract rate of return on an investment portfolio associated with the investment portfolio, and a variable speed of adjustment factor used in determining the contract rate of return wherein the variable speed of adjustment factor is computed by using an amount of the at least one measure of the variation and the amount of the measure of the variation changes over time;
   a computer programmed to carry out the steps of:
      computing, by accessing the memory and receiving market data corresponding to the at least one measure of the variation, the amount of the variation;
      calculating, by accessing the memory, using the amount of the variation, and receiving market data, the amount of the adjustment speed factor;
   determining, by receiving market data on the rate of return on the investment portfolio and by using the amount of the adjustment speed factor, at least one of a contract rate of return on the investment associated with the investment portfolio and a contract value for the investment associated with the investment portfolio; and
   outputting, at least one of the determined contract rate of return and the determined contract value at an output device.

13. The apparatus of claim 12, wherein the at least one measure of the variation includes at least one of:
   a variance, a covariance, a coefficient of variation, a standard deviation, a semi-variance, a semi-standard deviation, a third central moment, a fourth central moment, a duration, a volatility index and an implied volatility.

14. The apparatus of claim 12, further including storing a measure of an expected rate of return on the investment portfolio, and wherein computing includes computing an amount of the measure of the expected return and the determining includes using the amount of the expected rate of return in the determining said at least one of the contract rate of return on the investment and the contract value for the investment.

15. The apparatus of claim 14, wherein the at least one measure of the variation in the rate of return is a measure of the variation of the rate of return relative to the expected rate of return on the investment portfolio.

16. The apparatus of claim 14, wherein the measure of the expected rate of return is a yield to worst of the investment portfolio.

17. The apparatus of claim 14, wherein the measure of the expected rate of return is a moving average of the yield to worst of the investment portfolio.

18. The apparatus of claim 14, wherein the measure of the expected rate of return is a built-up moving average of the yield to worst of the investment portfolio.

19. The apparatus of claim 14, wherein the measure of the expected rate of return is a moving average of the rate of return on the investment portfolio.

20. The apparatus of claim 14, wherein the amount of the measure of the expected return is determined using the long-term average returns of the types of securities in the investment portfolio.

21. The apparatus of claim 14, wherein the amount of the measure of the expected rate of return is determined econometrically using economic and financial data.

22. The apparatus of claim 12, further including storing a breach ratio, and wherein the calculating includes using the breach ratio in calculating the amount of the adjustment speed factor.

23. A non-transitory tangible computer readable medium having code stored thereon, which when retrieved and executed on a computer performs the operations comprising:
  storing in memory terms of a contract, the terms including a specification of at least one measure of a variation in a rate of return corresponding to a return on an investment portfolio, a contract rate of return on an investment associated with the investment portfolio, and a variable speed of adjustment factor used in determining the contract rate of return, wherein the variable speed of adjustment factor is computed by using an amount of the at least one measure of the variation and the amount of the measure of the variation changes over time;
  computing, by a digital computer accessing the memory and receiving market data corresponding to the at least one measure of the variation, the amount of the variation;
  calculating, by a digital computer accessing the memory, using the amount of variation, and receiving market data, the amount of the adjustment speed factor;
  determining, by the computer receiving market data on the rate of return on the investment portfolio and by using the amount of the adjustment speed factor, at least one of a contract rate of return on the investment associated with the investment portfolio and a contract value for the investment associated with the investment portfolio; and
  outputting, by the computer, at least one of the determined contract rate of return and the determined contract value.

* * * * *